United States Patent [19]

von Bonin et al.

[11] Patent Number: 5,247,005
[45] Date of Patent: Sep. 21, 1993

[54] PROCESS FOR THE PRODUCTION OF MOULDINGS

[75] Inventors: Wulf von Bonin, Odenthal-Hahnenberg; Ulrich von Gizycki, Leverkusen, both of Fed. Rep. of Germany

[73] Assignee: Bayer Aktiengesellschaft, Leverkusen, Fed. Rep. of Germany

[21] Appl. No.: 885,094

[22] Filed: May 18, 1992

[30] Foreign Application Priority Data

May 25, 1991 [DE] Fed. Rep. of Germany ....... 4117074

[51] Int. Cl.$^5$ .......................... C08K 3/04; C01B 31/04; C09K 21/00
[52] U.S. Cl. ..................... 524/496; 523/218; 423/448; 423/449.8; 264/109
[58] Field of Search ............... 524/496; 523/218; 423/448; 264/109

[56] References Cited

U.S. PATENT DOCUMENTS

| | | |
|---|---|---|
| 3,574,644 | 4/1971 | Olstowski et al. |
| 3,885,007 | 5/1975 | Olsen et al. ............... 423/460 |
| 4,244,934 | 1/1981 | Kondo et al. ............... 264/109 |
| 4,529,742 | 7/1985 | von Bonin et al. ........... 521/108 |
| 4,873,071 | 10/1989 | Yamada et al. ............. 264/29.1 |
| 4,945,015 | 7/1990 | Milner et al. .............. 523/179 |
| 4,961,988 | 10/1990 | Zhu ........................ 428/229 |
| 4,977,194 | 12/1990 | Haas et al. ................ 521/99 |
| 4,992,481 | 2/1991 | von Bonin et al. .......... 521/54 |
| 5,053,148 | 10/1991 | von Bonin ................. 423/448 |
| 5,057,297 | 10/1991 | Fujii et al. ............... 423/448 |
| 5,094,780 | 3/1992 | von Bonin ................. 423/448 |

FOREIGN PATENT DOCUMENTS

| | | | |
|---|---|---|---|
| 0360606 | 3/1990 | European Pat. Off. | 423/448 |
| 0071507 | 4/1985 | Japan | 423/448 |
| 0012026 | 12/1989 | Japan | 423/448 |
| 403065505 | 3/1991 | Japan | 423/448 |

Primary Examiner—Paul R. Michl
Assistant Examiner—Olga Asinovsky
Attorney, Agent, or Firm—Sprung Horn Kramer & Woods

[57] ABSTRACT

In a particularly advantageous process for the production of mouldings from expandable graphite, the expandable graphite is first converted into a pre-expanded form and the latter is compression moulded in a compression moulding apparatus at temperatures below 180° C. to give performs. Moldings are produced from these preforms by heating in moulds to temperatures above 180° C.

8 Claims, No Drawings

PROCESS FOR THE PRODUCTION OF MOULDINGS

The present invention relates to a particularly advantageous production of mouldings from expandable graphites.

It is known that mouldings having low bulk densities can be produced by introducing expandable graphite into closed moulds and heating it therein to temperatures above 180° C.

Under these circumstances the expandable graphite expands and fills the mould. However, this process has the disadvantage that the expandable graphite, which is in flaky form, can cover relatively long expansion distances in complicated moulds only with difficulty. Consequently, the moulds are incompletely filled during expansion, the resulting mouldings have very different bulk densities at different points and the walls of the moulds are exposed to different pressures, which may cause deformations of the mould.

A process for the production of mouldings from expandable graphite has now been found, which is characterised in that expandable graphite is first converted into a preexpanded form, the latter is compression moulded in a compression moulding apparatus at temperatures below 180° C. to give preforms and mouldings are produced from these preforms by heating in moulds at temperatures above 180° C.

Suitable expandable graphites for the present invention are graphites of any type which are expandable on heating. They may be solid, swollen or already more or less partially expanded and may expand, for example, by 10 to 800 per cent by volume or more. Such expandable graphites (for example so-called graphitic acids and graphite salts) are known. They are generally graphites in the interstitial planes of which foreign atoms, ions or molecular groups are incorporated. Preferred graphites are so-called $NO_x$ and $SO_x$ expandable graphites, which can be prepared by the action of sulphuric acid or nitric acid on graphite, optionally in the presence of an oxidising agent (for example $H_2O_2$). Suitable expandable graphites can, if required, also be obtained by an electrochemical method.

The expandable graphites can be used as such, in (partially) neutralised form and/or together with auxiliaries. The auxiliaries may be, for example, oxidation stabilisers (such as phosphoric acids, boric acids, esters thereof, amides thereof, phosphates and/or borates), pH standardising agents (for example bases or base donors) and/or binders. Suitable binders are, for example, metal phosphates, metal phosphonates and metal phosphonate precursors, as described in German Offenlegungsschrift 3,912,552, as well as ammonium and amine salts, preferably (poly)alkylenepolyamine salts and alkanolamine salts (for example ethanolamine salts) of phosphoric acids (for example $H_3PO_4$), boric acids or of acidic phosphates of metals of the second and third groups of the Periodic Table of Elements, and additives described further below, if they have binder properties.

The expandable graphites may have, for example, average maximum particle diameters of 0.05 to 15 mm, preferably of 0.5 to 5 mm.

The expandable graphites and/or the pre-expanded forms to be produced therefrom can, if required, be mixed with other expandable or nonexpandable additives. Additives may be, for example: Perlites, vermiculites, expandable glasses, mica, clays, borosilicates, cokes, charcoals, hard coals, brown coals, graphite granules, cork granules, wood granules, cereal grains, cork, bark granules, expandable clay, foamed concrete, metal sponge, pumic, tuff and/or lava.

Auxiliaries, fillers and reinforcing agents may optionally be added, in dry or moist form, for example in the form of aqueous solutions or dispersions to the expandable graphites and/or to the pre-expanded forms to be produced therefrom, and can then be particularly uniformly distributed.

The fillers and reinforcing agents, which may optionally also be additives, may be, for example, fibres, crystallites, lamellae, dumbbells, spheres, hollow spheres, powders and/or granules of very different types, for example metal powders, metal chips, metal filaments, ground minerals, glasses, enamel frits, chalk, dolomite, kaolin, quartz, oxides and hydroxides of calcium, of magnesium, of aluminium and of iron, phosphates, silicates, aluminates, cements, gypsums, slags, fly ashes, coals, cokes, cellulose, bone, wood, bark, fruit, fruit peel, hay and straw comminution products and grains of maize, millet and cereals of very different species.

However, these may also be powders, solutions, emulsions, dispersions or suspensions which contain organic and/or inorganic salts, such as salts of the various sulphuric and phosphoric acids, borates, silicates, aluminates, formates, maleates, acetates, citrates and oleates, and/or nonionic, cationic and anioinic monomers, oligomers and polymers, such as carbohydrates (for example molasses, sugar, starches, celluloses and derivatives thereof), hydrocarbons and derivatives thereof (for example tar, bitumin, fats and waxes), glycols, polyols, polyamides, polyesters, natural and synthetic polyamides, proteins, caseins, chitins, natural and synthetic rubbers or other elastomers, homo- and copolymers of unsaturated hydrocarbon compounds (for example polymer and plastic dispersions known per se), polyurethanes, phenol resins, furan resins, urea resins, melamine/formaldehyde resins, epoxy resins, unsaturated polyester resins, polysulphide resins and/or polyimide resins.

Auxiliaries, additives, fillers and reinforcing agents may be present as a mixture with expandable graphite and/or the pre-expanded forms to be prepared therefrom, for example in total amounts of 0 to 85% by weight, preferably of 15 to 60% by weight. All possible combinations of two or more of these substances from one category and all possible combinations of two or more of these substances from different categories are also possible.

Phosphates, polyphosphates, carbohydrates, coals, cokes, bitumen-like residues, natural and/or synthetic polymers and/or surfactants and substances having an adhesive and/or thickening effect, such as molasses, starch, polyvinyl acetate hydrolysis products and/or acrylamide polymers, which can optionally also be used in the form of an aqueous solution or dispersion, are preferred.

Essential features of the present invention are that the expandable graphite used, optionally as a mixture with other materials, is converted into a pre-expanded form and this pre-expanded form, optionally as a mixture with other materials, is compression moulded in a compression moulding apparatus at temperatures below 180° C. to give preforms.

The pre-expanded forms can be obtained by effecting partial expansion of the expandable graphite by a thermal method so that the expandable graphite can expand even further on further heating. For example, temperatures in the range from 180° to 450° C., preferably from 180° to 300° C., can be chosen for the pre-expansion of the expandable graphite. The pre-expansion can be carried out until, for example, 10 to 95%, preferably 30 to 75%, of the volume expansion which occurs when the expandable graphite is heated under atmospheric pressure to 600° C. until it no longer expands has been achieved.

The compression moulding of the pre-expanded form or of mixtures containing pre-expanded forms is preferably effected under conditions where no further expansion of the expandable graphite takes place, that is to say, for example, at temperatures below 180° C. Temperatures in the range of 10° to 150° C., in particular those in the range of 15° to 100° C., are preferred. Compression moulding can be carried out with the moist pre-expanded form which is present, for example, in the form of a paste or of moist granules. However, it is preferable to compression mould the dry pre-expanded form. Compression moulding can be carried out so that the volume of the pre-expanded form or of the mixture containing pre-expanded forms decreases, for example, by 20 to 90%. The volume decrease is preferably 30 to 70%, in particular 30 to 50%.

In the compression moulding of the pre-expanded forms to give the preforms, pre-expanded forms having different bulk densities and/or pre-expanded forms having different compositions may optionally be used. Different preexpanded forms may be used as a mixture or in a defined arrangement with respect to one another. Thus, it is possible to obtain preforms, and mouldings therefrom, which have different densities and/or compositions at different points, that is to say, for example, have a sandwich-like structure. Reinforcing materials, for example in fibre form or in sheet form, can optionally also be included, prior to compression moulding, in the material to be compression moulded, examples of said reinforcing materials being metal foils, woven fabrics, nets, metal fibres, carbon fibres, mineral fibres or sheet-like textile structures of mineral, plastic or natural fibres.

It is also possible for the preform to be covered or coated, after its production, with a top layer, for example of metal foils, ceramic material, carbon fibres, mineral fibres, carbonising materials, surface coatings and/or binders. The moulding produced from the preform then contains such a top layer over some or all of its area.

The preform can be produced in the same mould in which the moulding is subsequently formed by heating to temperatures of above 180° C. For the production of a preform, it is also possible to use another mould, for example a less profiled and/or less detailed mould. It is also possible to produce a finished moulding from several preforms which are optionally of different shapes and/or compositions. The preform may also be treated, that is to say changed in its shape by mechanical processing, before being introduced into the mould for the production of the moulding.

It is in general advantageous if the dimensions of the preform already correspond as substantially as possible to those of the finished moulding, so that essentially only strengthening compaction is effected in the final heating. The preform can also have smaller dimensions than the finished moulding. In this case, it must be borne in mind that an expansion process which leads to complete filling of the mould may take place during final heating.

The finished moulding can be obtained from the preform directly, for example in the same mould and immediately after its production. The preforms can also be stored and/or transported outside the mould without significant material loss before finished mouldings are produced therefrom.

Steel has proved a suitable material for the mould for heating the preform to above 180° C. However, other materials are also suitable for this purpose, in particular other metals as well as glass, ceramic and plastics. The latter are preferred if heating is to be carried out by means of microwaves. The closed moulds which, however, permit the escape of gases are advantageously used.

It has proved advantageous to provide the moulds with release agents, for example with talc, graphite, starch solutions, aluminium or copper foils, paper, woven cotton fabrics or nonwoven viscose staple fabrics.

Heating itself may be effected, for example, by radiation, inductively, by alternating current voltage, by heating liquids or heating gases, for example in an oven in which the moulds containing the preforms are placed.

Heating for the production of the mouldings is carried out to temperatures above 180° C. Usually, heating is effected to temperatures of not more than 900° C., preferably to temperatures of not more than 800° C. In general, good results can be obtained with expansion temperatures between 200° and 600° C. The $SO_x$ and $NO_x$ expandable graphites preferably to be used generally reach their maximum expansion at 600° C. If it is intended to produce mouldings which as such are still expandable, it is advantageous to expand at temperatures of less than 400° C.

The mouldings thus obtainable have bulk densities of, for example, 0.01 to 0.6 g/cm$^3$, preferably of 0.05 to 0.45 g/cm$^3$.

The mouldings which can be produced according to the invention from expanded expandable graphite or mixtures containing this can be used where low weight has to be combined with high heat stability, good electrical conductivity, good electromagnetic shielding, advantageous fire characteristics and/or mechanical stability. Examples which may be mentioned are: vehicle construction, aircraft construction, rocket construction, furniture construction, container construction, fire prevention, apparatuses for moderate current and/or heat removal, supply and transmission, apparatuses for heat insulation and sound insulation, construction of heating systems and heat exchanger apparatuses, the construction of plants which are resistant to chemicals and shock-absorbing apparatuses and the construction of apparatuses for the reflection and/or absorption of electromagnetic waves.

The process according to the invention has a number of advantages. It permits the production of mouldings from expandable graphite and mixtures containing expandable graphite without the expandable graphite particles having to cover long expansion distances in the final process stage. Even in complicated moulds, it is possible to ensure that the said moulds are completely filled before and/or after the expansion process. The bulk density distribution of the mouldings thus produced, and hence the isotropy of the properties of these mouldings, can be greatly improved compared with mouldings which were produced by conventional methods. The process according to the invention also makes it possible to arrange a large number of any additives relatively uniformly or specifically as components of the moulding. The expandable graphite originally used no longer flows away as soon as the preform has formed.

EXAMPLES

The invention is illustrated below by way of example. The stated parts and percentages relate to weight, unless stated otherwise.

A commercial $SO_x$ expandable graphite which had an average maximum particle diameter of 2.5 mm, an expandability of more than 500% by volume, a sulphur content of 2.9% by weight and a bulk density of 700 g/l was used as the expandable graphite in the Examples.

EXAMPLE 1

Expandable graphite was heated to 295° C. in a steel vessel which was slowly stirred with a stirrer passing close to the walls. Here, it expanded to give a free-flowing, dusty material having a bulk density of 60 g/l.

This material was introduced in a level manner into a wooden mould having the internal dimensions 10×10×10 cm and was compressed with a ram at 22° C. from a height of fill of 10 cm to a height of fill of 6 cm. A preform which could be handled as a cohesive entity and measured 10×10×6 cm and had a bulk density of 100 g/l was then removed from the mould.

This preform was placed in an expansion mould which was composed of steel sheets, was gas-permeable at the joins and had internal dimensions of 10×10×6 cm and whose walls were coated with talc. Heating was effected in an oven to 600° C., and a stable moulded sheet having substantially greater abrasion resistance than the preform and possessing a bulk density of about 100 g/l was obtained.

EXAMPLE 2

The procedure was analogous to that of Example 1, except that the expandable graphite was pre-expanded at 255° C., and a pre-expanded form having a bulk density of 100 g/l was thus obtained.

This pre-expanded form was compressed in the same wooden mould up to a height of fill of 3 cm, a preform which was easy to handle and which could be removed from the mould without substantial material losses being formed from the pulverulent dust-producing pre-expanded form. The preform was placed in the expansion mould, which was adjusted to a height of 3 cm and in which two paper cover sheets had been placed. Heating was effected in an oven to 650° C. After cooling, a very stable, densely structured moulding having smooth top layers of paper pyrolysis product was present.

EXAMPLE 3

1000 parts of expandable graphite were mixed in a kneader with 372 parts of an 80% strength aqueous solution of the reaction product of 1 mol of aluminium hydroxide and 3 mol of $H_3PO_4$. 119 parts of ethanolamine were then added, heating occurring as a result of the neutralisation reaction. After cooling, drying and comminution, freeflowing granules of an expandable graphite coated with the phosphate were obtained. The phosphate is simultaneously the binder and the oxidation stabiliser. These granules were converted into a pre-expanded form in the manner described in Example 1. A pre-expanded form having a bulk density of 100 g/l was obtained at a temperature as low as 215° C.

A steel mould having internal dimensions of 10×10×10 cm was charged with this pre-expanded form, the bottom and top surfaces being covered with aluminium foil. Heating was then effected to 150° C., and compression was effected from a height of fill of 10 cm to 5 cm by means of a ram resting on the upper aluminium foil. After cooling, a preform which could be handled without material loss and whose bulk density was 0.20 g/cm$^3$ (after removal of the aluminium cover foil) was removed from the compression moulding apparatus.

This preform was placed in a mould which was composed of stable steel sheets, was gas-permeable at the joints and had the internal dimensions 10×10×5 cm, and was heated to 550° C. after the mould had been closed. A finely structured sheet-like moulding whose bulk density was 0.2 g/cm$^3$ and which had an indentation hardness of 24 kg/cm$^2$ was obtained. The indentation hardness of the preform without the aluminium top layer had been 6 kg/cm$^2$.

EXAMPLE 4

100 parts of the pre-expanded form obtained according to Example 3 were thoroughly mixed with 100 parts of fully expanded commercial vermiculite (bulk density 200 g/l) having the particle size grade 2, and the mixture was compressed in a mould, analogously to Example 3, from a height of fill of 10 cm, to 5 cm. A preform which could readily be handled was obtained and was heated to 600° C. in a 5 cm sheet mould analogously to Example 3. A stable moulding having a bulk density of 0.3 g/cm$^3$ was obtained.

EXAMPLE 5

The procedure was as in Example 4, except that, instead of vermiculite, a fraction of an aluminosilicate fly ash having a bulk density of 200 gl was used, the said fraction consisting of hollow spheres having a maximum diameter of 0.7 mm.

In this case too, a preform which could readily be handled was obtained, and a stable moulding was obtained by subsequent heating to 600° C.

EXAMPLE 6

The pre-expanded form (70% by weight) obtained according to Example 1 was sprayed with commercial cationic bitumen emulsion (30% by weight) having a solids content of 30% by weight, while stirring. A moist, free-flowing mixture was formed and was compressed from a bed height of 10 cm to 5 cm in a wooden mould according to Example 1. A preform which was very easy to handle was obtained. This was processed, without drying, in a steel mould according to Example 1 at 600° C. with expansion from 5 to 6 cm height to give a stable moulding (sheet). The sheet obtained had a bulk density of 0.09 g/cm$^3$ and an indentation hardness of 11 kg/cm$^2$.

EXAMPLE 7

The procedure was as in Example 6, except that a 30% strength by weight aqueous solution of secondary ammonium phosphate was used instead of the bitumen emulsion. The sheet finally obtained had a bulk density of 0.09 g/cm$^3$ and an indentation hardness of 8.5 kg/cm$^2$.

EXAMPLE 8

Expandable graphite granules produced as in Example 3 were converted into a pre-expanded form having a bulk density of 30 g/l with slow stirring at 300° C. The preexpanded form was compressed from a height of fill of 10 cm to a height of fill of 1 cm in a steel mould according to Example 3. A relatively stable preform which could readily be handled was obtained here.

A pre-expanded form having a bulk density of 100 g/l was then produced from the same expandable graphite at 215° C. and compressed from a bed height of 10 cm to 6 cm. Here too, a dimensionally stable perform which could readily be handled was obtained.

Both preforms were then placed one on top of the other in the stable steel mould according to Example 3, adjusted to a height of 7 cm, so that a type of sandwich—aluminium foil, preform 1, preform 2, aluminium foil—was formed. The closed mould was heated to 600° C. (15 minutes standing time at 600° C.) and cooled, after which a stable sandwich having adhering aluminium top layers and an asymmetric bulk density distribution was removed. The bulk densities of the two layers were 0.3 and 0.16 g/cm$^3$.

The experiment was repeated, paper, bitumen board, cotton fabric and mineral fabric being placed in the steel mould between the two preforms in separate batches. The bulk density distribution in the finished moulding remained virtually unchanged. In all cases, sandwiches having a good bond between the components were formed.

EXAMPLE 9

A steel pipe bent into a sinusoidal waveform is arranged so that it passes through an elongated box of steel sheet which surrounds the wavy bend. The surrounding box is divided into halves in the plane of the wave form so that it encloses the bent pipe in the manner of a carton which can be opened. The volume of the box which is not occupied by the pipe is to be filled with an expanded filling of expandable graphite.

For this purpose, the pre-expanded form according to Example 3 was used. Both halves of the box were filled to excess with the pre-expanded form by means of the auxiliary mould, after which the pre-expanded form was compressed by 30% by volume by means of a correspondingly shaped ram in the box. The two halves were then filled flush. A preform was formed in the expansion mould, that is to say in the steel box surrounding the pipe. The two box halves could then be moved and could be rotated about all axes without the pre-expanded form flowing out. The coiled pipe was then placed in the intended position on one filled box half, and the other box half was placed on top in the intended position. The box was closed by further pressure, the pipe pressing itself as an exact fit into the preforms present in the box halves. The two filled box halves were then closed with fold connections through which gases could still escape.

The construction prepared in this manner was heated to 600° C. This was effected by means of heating gases which were passed through the coiled pipe. As a result of the residual expansion of the box contents, both halves of the filling were joined, and the original preform was converted into a stable, vibration-resistant moulding which completely filled the free space between the coiled pipe and the box wall. Constructions of this type can be used in waste gas removal from internal combustion engines.

EXAMPLE 10

A pre-expanded form having a bulk density of 50 g/l was produced from the granules according to Example 3 at 228° C.

Spheres having a mean diameter of 5 mm were produced on a compression moulding apparatus from the pre-expanded form with 50% volume compression. These spheres had the advantage that they did not produce dust and could readily be handled. They were introduced into a pipe of ceramic material having a diameter of 6 mm. The pipe filled in this manner was closed at both ends with a plug of refractory wool and brought to 600° C. As shown by a section through the pipe, said pipe was then very homogeneously filled with the electrically conductive filling of expanded expandable graphite and can serve as a heating element.

Such spheres were also introduced into the expansion mould according to Example 3, and sheet-like mouldings were obtained in this manner at 600° C.

EXAMPLE 11

The preform obtained according to Example 3 was heated in the stable expansion mould described there, not to 550° C. but only to 300° C. A stable, finely structured moulding having an indentation hardness of 18 kg/cm$^2$ was obtained in this manner. However, this moulding had the property of being able to continue expanding considerably on flame application (=intumescent character), a property which is of interest for the production of, for example, cable bulkheads in the fire prevention sector.

What is claimed is:

1. A process for the production of mouldings from expandable graphite, in which expandable graphite is first converted into a pre-expanded form, the latter is compression moulded in a compression moulding apparatus at temperatures below 180° C. to give preforms and mouldings are produced from these preforms by heating in moulds to temperatures above 180° C.

2. The process of claim 1, in which expandable graphites are used together with auxiliaries.

3. The process of claim 1, in which expandable graphite and/or the pre-expanded forms to be produced therefrom is mixed with perlite, vermiculite, expandable glass, mica, clay, borosilicate, coke, charcoal, hard coal, brown coal, graphite granules, cork granules, wood granules, cereal grains, cork, bark granules, expandable clay, foam concrete, metal sponges, pumice, tuff and/or lava.

4. The process of claim 1, in which metal powder, metal chips, metal filaments, ground minerals, glass, enamel frits, chalk, dolomite, kaolin, quartz, oxides and hydroxides of calcium, of magnesium, of aluminium and/or of iron, phosphate, silicate, aluminate, cement, gypsum, slag, fly ash, coal, coke, cellulose, bone, wood, bark, fruit, peel, hay and/or straw comminution products, cereal grains, organic and/or inorganic salts, nonionic, cationic and/or anionic monomers, oligomers and/or polymers, hydrocarbons, hydrocyrbon derivatives, glycol, polyol, polyether, polyester, natural and/or synthetic polyamide, protein, casein, chitin, natural and/or synthetic rubber, other elastomers, homo- and/or copolymers of unsaturated hydrocarbon compounds, polyurethane, phenol resin, furan resin, urea resin, melamine/formaldehyde resin, epoxy resin, unsaturated polyester resin, polysulphide resin and/or polyamide resin are added to the expandable graphite and/or to the pre-expanded forms to be prepared therefrom.

5. The process of claim 1, in which the pre-expansion of the expandable graphite is carried out at temperatures in the range from 180° to 450° C.

6. The process of claim 1, in which the compression moulding of the pre-expanded form is carried out at 10° to 150° C. in such a way that the volume decreases by 20 to 90%.

7. The process of claim 1, in which the dimensions of the preform correspond as substantially as possible to those of the finished moulding, and essentially only compaction is effected in the final heating.

8. The process of claim 1, in which the production of the moulding is carried out at 200° to 600° C.

* * * * *